United States Patent
Burkart

(10) Patent No.: US 9,287,695 B2
(45) Date of Patent: Mar. 15, 2016

(54) BREAKER CONTROL SWITCH WITH A TIME-DELAY CLOSE FUNCTION TO MITIGATE AN AURORA EVENT

(75) Inventor: Don Burkart, Long Beach, NY (US)

(73) Assignee: Consolidated Edison Company of New York, New York, NY (US)

( * ) Notice: Subject to any disclaimer, the term of this patent is extended or adjusted under 35 U.S.C. 154(b) by 983 days.

(21) Appl. No.: 13/397,343

(22) Filed: Feb. 15, 2012

(65) Prior Publication Data

US 2013/0208381 A1    Aug. 15, 2013

(51) Int. Cl.
*H01H 73/00* (2006.01)
*H02H 3/06* (2006.01)
*H02H 7/06* (2006.01)
*H02H 7/08* (2006.01)

(52) U.S. Cl.
CPC ............... *H02H 3/066* (2013.01); *H02H 7/06* (2013.01); *H02H 7/08* (2013.01)

(58) Field of Classification Search
CPC ..................................................... H01H 71/123
USPC .......................................................... 361/115
See application file for complete search history.

(56) References Cited

U.S. PATENT DOCUMENTS

| | | | | | |
|---|---|---|---|---|---|
| 4,166,221 | A | * | 8/1979 | McGaha et al. | 290/40 R |
| 4,845,594 | A | * | 7/1989 | Wilkerson | 361/71 |
| 4,999,728 | A | * | 3/1991 | Curl | H02H 3/24 340/663 |
| 5,170,310 | A | * | 12/1992 | Studtmann et al. | 361/94 |
| 8,212,423 | B2 | * | 7/2012 | Saito | 307/127 |

* cited by examiner

*Primary Examiner* — Stephen W Jackson
(74) *Attorney, Agent, or Firm* — Kenneth E. Horton; Kirton McConkie

(57) ABSTRACT

Control circuits for breaker control switches with a time-delay function and associated methods of making and using these devices to prevent an aurora event are disclosed. An exemplary control circuit may include a signaling device configured to provide a close signal for a circuit breaker to close; a timer configured to complete a countdown after the circuit breaker is opened; and a switch configured to close the circuit breaker after the countdown is complete and when the close signal is provided by the device. This may prevent engaging a piece of equipment with the power grid when the piece of equipment is out of phase or frequency with the power grid, which often leads to significant damage or destruction of the piece of equipment. Other embodiments are described.

23 Claims, 4 Drawing Sheets

BREAKER CONTROL SWITCH WITH A TIME-DELAY CLOSE FUNCTION TO MITIGATE AN AURORA EVENT

FIELD

This application relates generally to safety equipment for use with power equipment attached to a power supply grid. More specifically, this application relates to systems and methods for preventing power equipment from being destroyed by an aurora event.

BACKGROUND

Rotating AC electrical equipment connected to the power grid, such as motors and generators, spin in sync or in phase with the grid power. If the rotating equipment becomes out of phase (for example, by a rapid stop-start sequence) or by connecting to the grid without synchronizing the relevant phases, the equipment will be forced almost instantaneously into phase with the grid. This abrupt change is known as an aurora event. The North American Electric Reliability Corporation's (NERC) recognized this vulnerability and issued a Recommendation to Industry in 2011 to the industry to encourage solutions to prevent Aurora events.

Aurora events can result in exceptionally high torques being placed on mechanical components of rotating equipment and associated loads, such as transmissions, pumps, gear boxes, compressors, shafts, turbines, etc. This torque can result in the mechanical components far exceeding their design limitations. Damage or destruction of the rotating equipment and attached devices often results from aurora events. Similarly, electrical windings and components may be damaged by exceptionally high loading during the instant phase realignment event.

High power equipment such as large motors and generators are particularly vulnerable to aurora events because of the high mass rotating components of high power equipment. For example, an 800 kW generator requires substantial mechanical components to transfer mechanical energy and power through the generator and will, therefore, generally have large spinning and moving components that have very high inertial energy when rotating or otherwise moving. When an aurora event occurs, the already rotating equipment attempts to rapidly adjust to a different rotation phase or speed, creating massive torque as the inertial energy of the moving components resists the change to the different phase or speed. Since F=ma, a quick change in speed produces a very high acceleration (a) multiplied by the mass (m) of the moving components creates a very high force (F), which can be exhibited through torque in rotating components. The high force and torque can easily overcome design limitations and destroy critical components of the motor or generator and attached load devices.

SUMMARY

This application relates to control circuits for breaker control switches with a time-delay function and associated methods of making and using these devices to prevent an aurora event. In some embodiments, an exemplary control circuit may include a signaling device configured to provide a close signal for a circuit breaker to close, a timer configured to complete a countdown after the circuit breaker is opened, and a switch configured to close the circuit breaker after the countdown is complete and when the close signal is provided by the device.

In some embodiments, the signaling device may be a manual switch or a computer. The circuit breaker may connect power equipment to a power supply grid. The power equipment may be three-phase power equipment. In other embodiments, the countdown may be determined based on the time required for the power equipment to completely stop after being disconnected from the power grid. The switch may be an AND logic gate, and the control circuit may include an integrated circuit, with the timer and the switch each as components of the integrated circuit.

The signaling device may be further configured to provide a trip signal. The countdown may begin when the signaling device provides the trip signal. In other embodiments, the countdown may begin when the circuit breaker is opened.

In some embodiments, a method of controlling a circuit breaker may include the steps of opening the circuit breaker; starting a countdown; generating a close signal associated with a command to close the circuit breaker; closing the circuit breaker after the countdown is complete and after the signal associated with the command to close the circuit breaker is generated; and resetting the countdown. The close signal may be associated with the command to close the circuit breaker is generated by a manual switch.

The method may further include generating a trip signal associated with a trip mode of the circuit breaker. The countdown may begin when trip signal is generated or when the circuit breaker is opened. In some embodiments, the close signal may be generated by a remote computer.

BRIEF DESCRIPTION OF THE DRAWINGS

The following description can be better understood in light of the Figures, in which.

Figure 1:
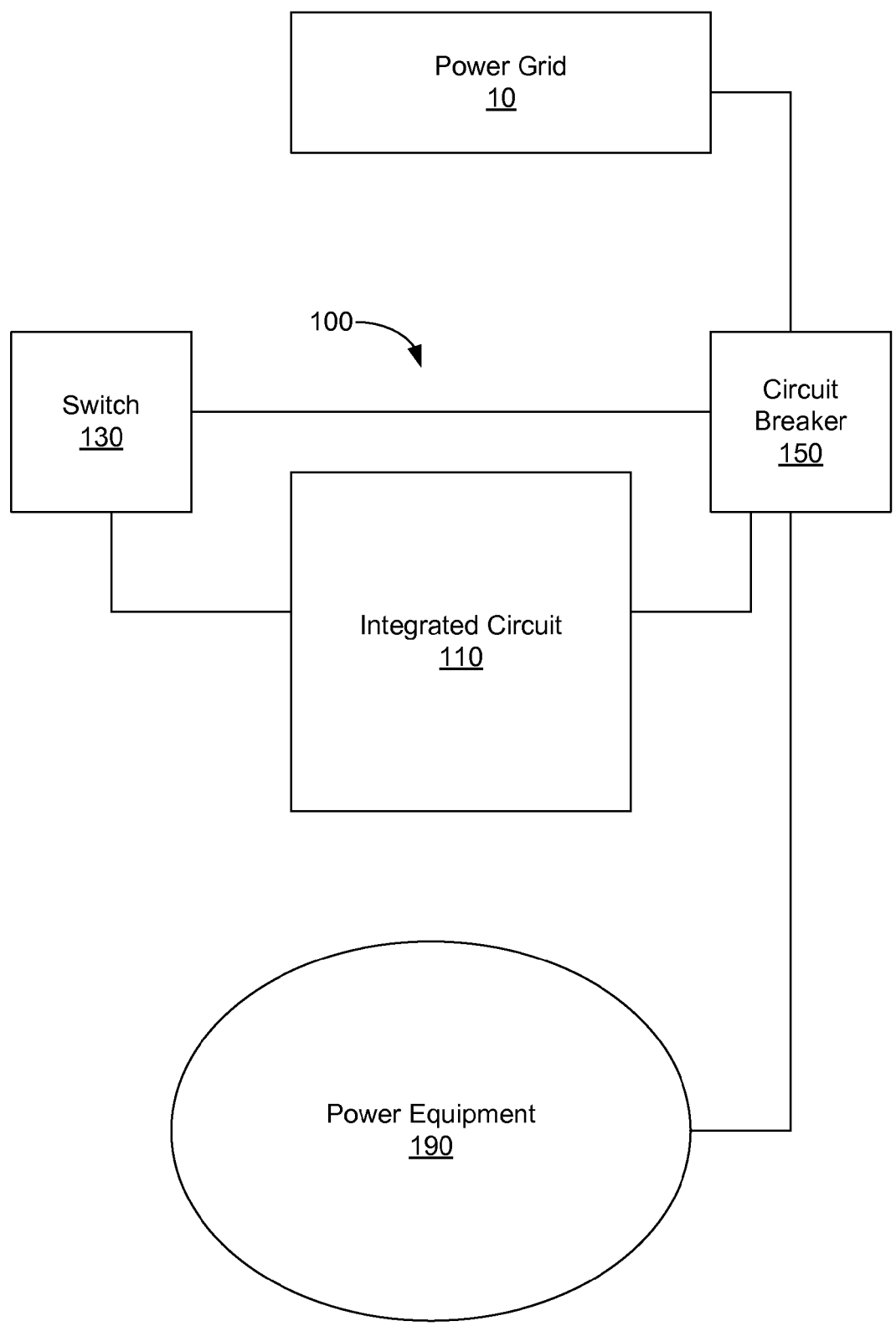
FIG. 1 shows a schematic illustration of an exemplary embodiment of a circuit for a breaker control switch with a time-delay close function used with equipment.

The Figures illustrate specific aspects of exemplary breaker control switches with a time-delay function and methods for making and using such devices as described below. Together with the following description, the Figures demonstrate and explain the principles of the structures, methods, and principles described herein. In the drawings, the thickness and size of components may be exaggerated or otherwise modified for clarity. The same reference numerals in different drawings represent the same element, and thus their descriptions will not be repeated. Furthermore, well-known structures, materials, or operations are not shown or described in detail to avoid obscuring aspects of the described devices. Moreover, the Figures may show simplified or partial views, and the dimensions of elements in the Figures may be exaggerated or otherwise not in proportion for clarity.

DETAILED DESCRIPTION

The following description supplies specific details in order to provide a thorough understanding. Nevertheless, the skilled artisan would understand that the described breaker control switches with a time-delay function and methods of making and using the breaker control switches can be implemented and used without employing these specific details. Indeed, the breaker control switches and associated methods can be placed into practice by modifying the illustrated devices and methods and can be used in conjunction with any other apparatus and techniques conventionally used in the industry. For example, while the description below focuses on methods for making and using a digitally enhanced manual switch and solid-state components to control the breaker control switch with a time-delay function, other components such as electronic switches, and programmed signals may be used.

In addition, as the terms on, attached to, or coupled to are used below, for clarity of describing function, one object (e.g., a material, a layer, a substrate, etc.) can be on, attached to, or coupled to another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

Some embodiments of the breaker control switch with a time-delay function and associated methods of making and using these switches are described in detail herein and illustrated in the Figures. FIG. 1 illustrates a schematic representation of a control circuit 100 for a breaker control switch with a time-delay function in operative connection with power equipment 190 and a power grid 10. The control circuit 100 may be used to control the power supply or the connection between any electrical equipment 190 and any power grid 10 through the circuit breaker 150. The power grid 10 may be a complete electrical network or a part of an electrical network that supplies any type of power. The power grid 10 may be any power supply grid such as various types of public utility power grids used throughout the world, as well as private grids created by or for individual companies, compounds, and instillations.

The control circuit 100 may include any integrated circuit 110. In the embodiments shown in FIG. 2, the control circuit 100 and the integrated circuit 110 may include an AND logic gate 120 (or other component or components that perform the same function such as a microprocessor or other similar device), as well as any other components to effect the functionality of a breaker control switch with a time-delay function to prevent aurora events, as described herein. The integrated circuit 110 may require a time-delay for manual or automated attempts to close a circuit connecting the power equipment 190 to the grid 10. By providing a time delay, the power equipment 190 may be given time enough to stop prior to any attempt to reconnect to the grid, thereby preventing an aurora event.

The AND logic gate 120 may be any component or combination of components capable of effectuating an AND logic function. In other words, both input signals may be present to allow an output signal. In this case, both a timer signal indicating that a countdown is complete and a signal to close the circuit breaker may be required before a signal to close the circuit breaker is sent to close the circuit breaker. Other similar components may be used in place of an AND gate, for example, a comparator, OP Amps, or even programming logic through a microprocessor on controller may perform the function of the AND logic gate 120, as described herein.

Many pieces of power equipment 190, particularly power equipment requiring very high current to run, include a soft-start or a safe start circuits that allow the power equipment 190 to start properly without damaging it. The power equipment 190 may require a significant current draw when starting, such that the power draw during start-up may be several times the power required for the power equipment 190 to run at the designed functional loading.

When connecting generators to the power grid 10, the generator is generally brought up to speed slowly and then synchronized before connecting the generator to the grid to avoid damage to the generator. If the power equipment 190 is improperly disconnected and reconnected without synchronizing or allowing the start circuits to function properly, significant damage to the power equipment 190 may result.

Figure 2:
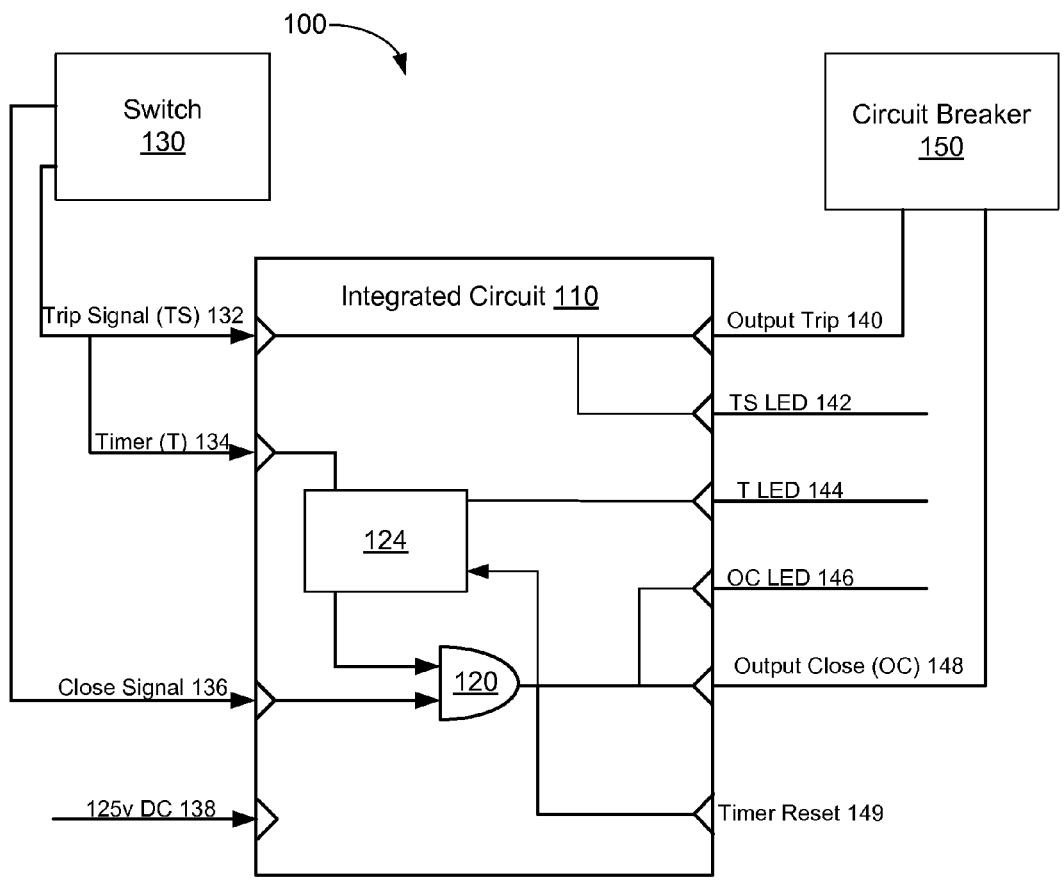
FIG. 2 shows a schematic illustration of an exemplary embodiment of a circuit for a breaker control switch with a time-delay close function used with equipment.
Figure 3:
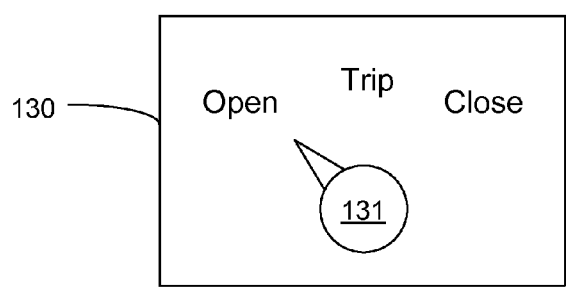
FIG. 3 shows an exemplary manual switch for use with a breaker control switch with a time-delay function.

As shown in FIGS. 2 and 3, when the switch 130 is set to a trip (or off) position, the circuit breaker 150 disconnects the power equipment 190 from the grid 10. In order to close the circuit breaker 150 to connect the power equipment 190 to the grid 10, the knob 131 of switch 130 may first be set to trip before being moved to the closed position, indicating that the power equipment 190 is connected to the grid 10. When the switch 130 is on the trip position, the trip signal 132 and the timer signal 134 may be provided to the integrated circuit 110 and the trip signal LED 142 and the timer LED 144 may be lit, indicating that the timer 124 is counting. Once the timer 124 has counted an appropriate time interval, the timer LED 144 may be turned off and a signal may be sent to the AND logic gate 120 to permit the output close signal 148 to be sent if the close signal 136 is also present at the AND logic gate 120. As such, in some embodiments, the AND logic gate 120 and the integrated circuit 110 function as a timed switch to only allow the output close 148 signal to close the circuit breaker 150 when the close signal 136 is present and the timer 124 has performed the required countdown.

When the knob 131 of the switch 130 is moved to the close position, the close signal 136 may be provided to the integrated circuit 110 and to the AND gate 120. If both inputs to AND gate 120 are present, output close signal 148 may be sent to circuit breaker 150 to close the connection between power equipment 190 and the grid 10. Additionally, timer 124 may be reset once the circuit breaker 150 is closed such that the timer 124 will automatically delay any subsequent attempts to close the circuit breaker 150 after it trips or is opened. In some embodiments, the knob 131 may be biased such that it cannot be set to the close position, but merely toggled to the close position and then be maintained in the trip position during normal operations to allow circuit breaker 150 to trip as needed to prevent overload of the circuit.

The control circuit 100 also contains a timer 124. The timer 124 may provide a time delay of any desired length, which can be selected depending on the time required to either stop or sync rotating components of the power equipment 190. For example, a 300 hp pump chiller motor may require at least two minutes to completely stop to allow the start circuit to perform as designed when the chiller motor is restarted. The rotating internal components and any components attached to the chiller motor may be required to be stopped completely before being connected to three-phase power to ensure proper start-up and to avoid aurora events that would otherwise damage or destroy the chiller motor or other components. In such embodiments, the timer 124 would have at least a two minute time limit before the control circuit 100 would allow a user or automated signal to affect the breaker 150 to close.

In some configurations, the time delay may be sufficient to allow a generator to re-synchronize with the power grid 10 before being connected back to it. Generally, the power equipment 190 requiring the control circuit 100 may be multi-phase equipment such as large generators, chiller motors, electric arc furnaces, compressors, pumps, renewable energy systems, synchronous motors, large induction motors, etc., since the electrical power equipment 190 is most efficient when running on multiple phases, such as the common 3-phase systems of most power grids. In some embodiments, the input power 138 for the control circuit 100 and integrated circuit 110 may be 125V DC or 48V DC, or any other suitable voltage input.

In some embodiments, the timer 124 may be programmable to a desired time limit, or the timer 124 may be set to a particular time limit. In other embodiments, the timer 124 may be replaced with other sensors that sense when it is safe to close the circuit breaker 150. For example, a sensor may signal that all rotating components of the power equipment 190 have stopped, or may signal when phases are properly aligned when connecting a generator to the power grid 10. In such embodiments, the timer signal 134 could be replaced with a sensor signal to indicate to the AND logic gate 120 when the output close signal 148 may be sent to the circuit breaker 150 to close the circuit.

In other embodiments, the timer 124 may automatically perform its countdown whenever the circuit breaker 150 is opened. In these embodiments, when the power equipment 190 has been sitting idle for some long period of time, the time interval will have already been accomplished and the circuit breaker 150 may be started immediately as desired by the user. For example, the timer 124 may be activated when the switch 130 is in the open position and would countdown, extinguishing the timer LED 144 once completed. In these embodiments, the timer 124 would not need to countdown again when the switch 130 is moved to the trip position.

Figure 4:
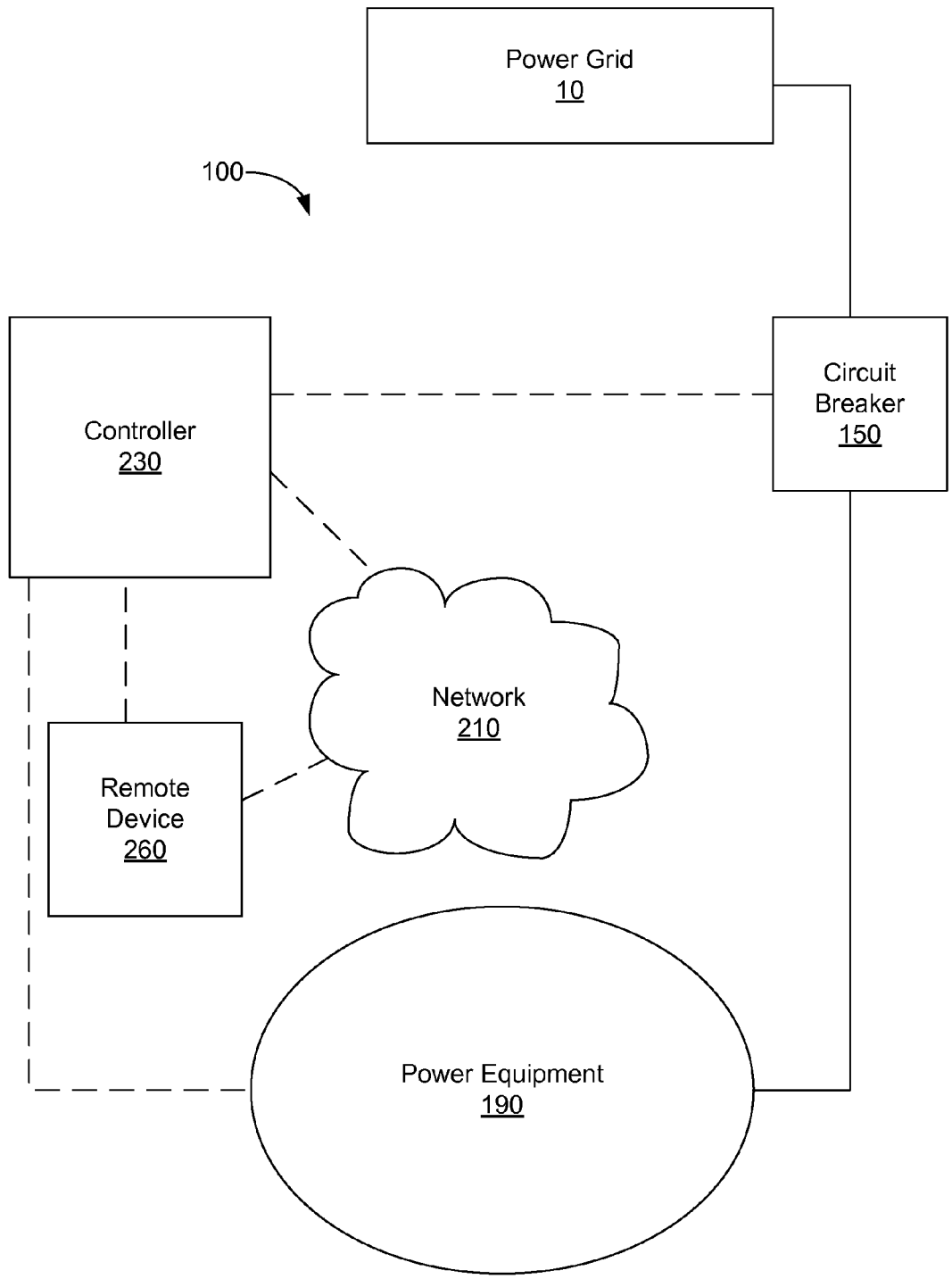
FIG. 4 shows a schematic illustration of an exemplary embodiment of a circuit for a breaker control switch with a time-delay close function used with equipment.

In the embodiments illustrated in FIG. 4, a controller 230 may be used in place of integrated circuit 110 to control the circuit breaker 150. In such embodiments, the controller 230 may be accessed remotely (or indirectly) by a remote device 260 through a network 210 or it may be accessed directly. In some configurations, the controller 230 may also directly control the function of the power equipment 190. The controller 230 may include wireless communication capabilities or may be connected to a remote device 260, network 210, power equipment 190, and/or circuit breaker 150 through any wired or wireless communications. The network 210 may be the internet, a wide area network, a local area network, or any other electronic network that allows multiple devices to communicate electronically. The controller 230 may be a local computer, microprocessor, plant server, or any other device capable of electronically controlling the control circuit 100 and/or the circuit breaker 150.

In some configurations, the remote device 260 may connect to the controller 230, the network 210, or both using any communications protocols or systems sufficient to transmit instructions to the controller 230. The remote device 260 may be any device that can send control signals to the controller 230. For example, the remote device 260 may be a notebook computer, a workstation, a mobile phone, a tablet computer, a remote server, etc. And the remote device 260 may also function in a delayed manner, running a script automatically and/or remotely.

In some instances, an unauthorized user may set a malicious code or program, such as a virus, trojan, or worm in the controller 230, any component of the network 210, or on a remote device 260 that may connect with the controller 230. The malicious code or program may function such that it would signal to maliciously open and then close the circuit breaker 150 with the design of destroying the power equipment 190 and cause an aurora event. In these instances, the malicious signal may be sent at a pre-determined time or when the remote device 260 is connected with the controller 230. When used, the control circuit 100 would prevent an aurora event due to such a malicious signal. In other configurations, the control circuit 100 could also prevent user error in rapidly opening and closing the circuit breaker 150 that may cause an aurora event.

Figure 5:
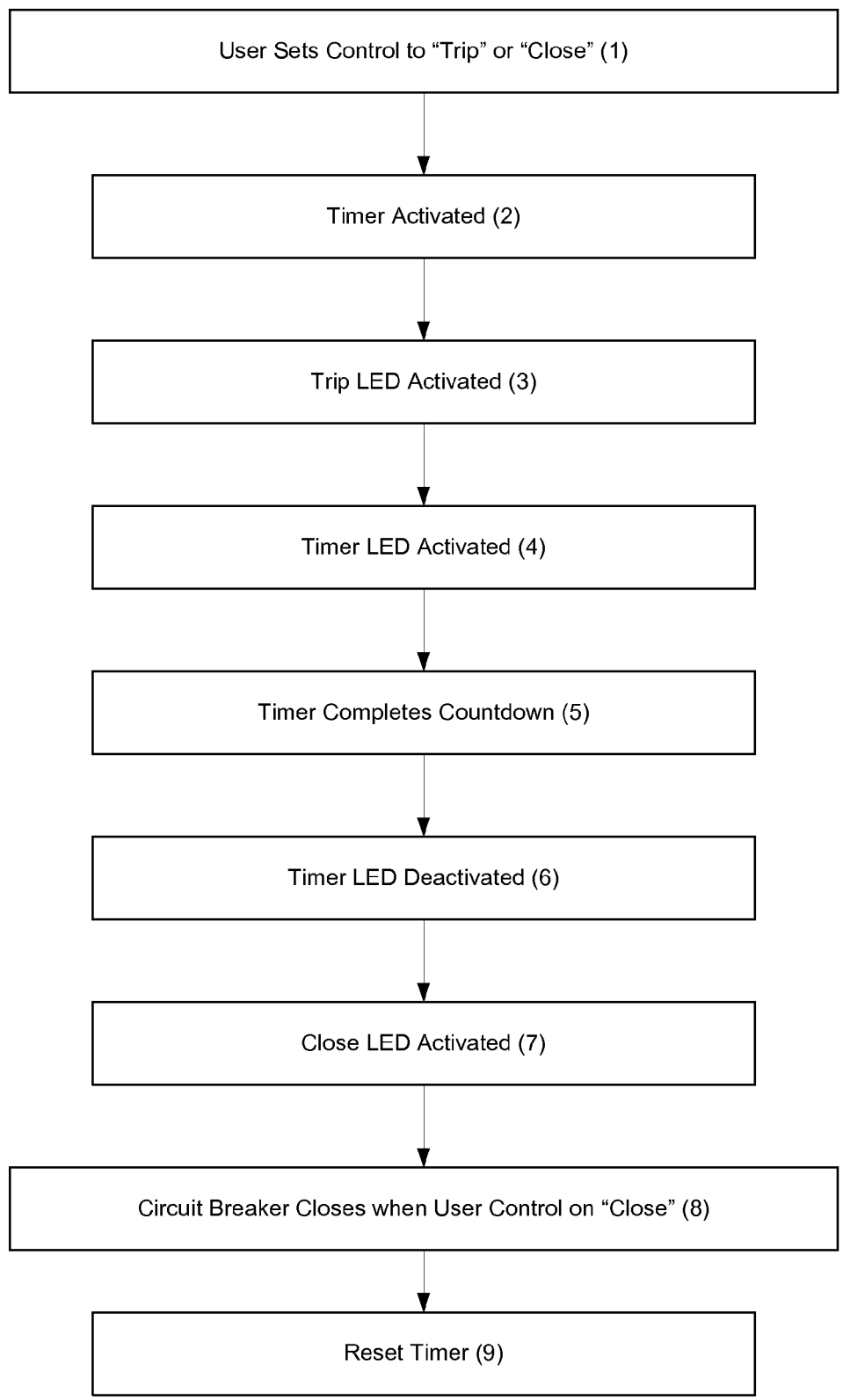
FIG. 5 shows a flow chart depicting some embodiments of a method for using an exemplary breaker control switch a time delay function.

FIG. 5 illustrates embodiments of a method for using the control circuit 100 to prevent damage to the power equipment 190. Once the circuit breaker 150 is opened, the process illustrated in FIG. 5 may be employed to prevent such damage. As shown in box 1, when a user attempts to close the circuit to attach power equipment to the grid, the timer 124 may be activated in box 2. Then, the trip signal LED 142 representing a trip function can be illuminated (as shown in box 3) and the timer LED 144 representing the activated timer countdown may be illuminated (as shown in box 4). Once the timer 124 completes its countdown, as shown in box 5, the timer LED 144 representing the timer countdown may be extinguished (as shown in box 6) and the output close LED 146 representing a readiness of control circuit 100 to close circuit breaker 150 may be activated, as shown in box 7.

If the user has set switch 130 to close, as shown in box 8, it will close once the timed countdown is complete and the timer LED 144 is extinguished. Otherwise, the circuit breaker 150 will close once the timer 124 in complete, allowing the timer signal 134 to pass to the AND gate 120, and the switch 130 is set to close, sending the close signal 136 to the AND gate 120. Once the circuit breaker 150 is closed, the timer 124 may automatically reset (as shown in box 9) so that in the event of a tripped breaker or a user or a signal otherwise opening the breaker 150, it will not be able to be closed until the timer 124 again performs the timed countdown to completion.

High power equipment is usually expensive and can be very vulnerable to damage or destruction from an aurora event. The costs to repair or replace high power equipment can easily accumulate to hundreds of thousands (or millions) of dollars for large generators, motors, compressors, pumps, gearboxes, etc. And an initial failure of a single component in the high power equipment can cause subsequent failure of attached components or device, cascading such damage through rotating power equipment and significantly increasing costs of repair. As such, the control circuit 100 described herein and other embodiments consistent with this disclosure may be very valuable to companies and individuals for protection of their power equipment.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation, and use may be made without departing from the principles and concepts set forth herein. Also, as used herein, the examples and embodiments, in all respects, are meant to be illustrative only and should not be construed to be limiting in any manner.

The invention claimed is:

1. A circuit control device, comprising:
   a signaling device configured to provide a close signal for a circuit breaker to close, the circuit breaker connecting power equipment to a power grid;
   a timer configured to complete a countdown after the circuit breaker is opened; and
   a switch configured to close the circuit breaker after the countdown is complete and when the close signal is provided by the device, wherein the countdown is determined based on the time required for the power equipment to completely stop after being disconnected from the power grid.

2. The circuit control device of claim 1, wherein the signaling device comprises a manual switch.

3. The circuit control device of claim 1, wherein the power equipment comprises three-phase power equipment.

4. The circuit control device of claim 1, wherein the switch comprises an AND logic gate.

5. The circuit control device of claim 1, further comprising an integrated circuit, wherein the timer and the switch are both components of the integrated circuit.

6. The circuit control device of claim 1, wherein the signaling device comprises a remote computer.

7. The circuit control device of claim 1, wherein the signaling device is further configured to provide a trip signal.

8. The circuit control device of claim 7, wherein the countdown begins when the signaling device provides the trip signal.

9. The circuit control device of claim 1, wherein the countdown begins when the circuit breaker is opened.

10. A method of controlling a circuit breaker, comprising:
    opening a circuit breaker, the circuit breaker connecting power equipment to a power grid;
    starting a countdown, wherein the countdown is determined based on the time required for the power equipment to completely stop after being disconnected from the power grid;
    generating a close signal associated with a command to close the circuit breaker;
    closing the circuit breaker after the countdown is complete and after the signal associated with the command to close the circuit breaker is generated; and
    resetting the countdown.

11. The method of claim 10, wherein the close signal associated with the command to close the circuit breaker is generated by a manual switch.

12. The method of claim 10, wherein the power equipment comprises three-phase power equipment.

13. The method of claim 10, wherein the closing the circuit breaker is affected using an AND logic gate.

14. The method of claim 10, wherein the countdown and the closing the circuit breaker are affected by components of an integrated circuit.

15. The method of claim 14, further comprising generating a trip signal associated with a trip mode of the circuit breaker.

16. The method of claim 14, wherein the countdown begins when the trip signal is generated.

17. The method of claim 10, wherein the countdown begins when the circuit breaker is opened.

18. The method of claim 10, wherein the close signal is generated by a remote computer.

19. A power system, comprising:
    a power grid;
    power equipment;
    a circuit breaker device connecting the power grid to the power equipment, the circuit breaker containing:
      a signaling device configured to provide a close signal for a circuit breaker to close;
      a timer configured to complete a countdown after the circuit breaker is opened, wherein the countdown is determined based on the time required for the power equipment to completely stop after being disconnected from the power grid; and
      a switch configured to close the circuit breaker after the countdown is complete and when the close signal is provided by the device.

20. The power system of claim 19, wherein the power equipment comprises three-phase power equipment.

21. The power system of claim 19, wherein the switch comprises an AND logic gate.

22. The power system of claim 19, wherein the signaling device is further configured to provide a trip signal and the countdown begins when the signaling device provides the trip signal.

23. The power system of claim 19, wherein the countdown begins when the circuit breaker is opened.

* * * * *